H. D. HATHAWAY.
PEDAL ATTACHMENT FOR AUTOMOBILES.
APPLICATION FILED APR. 5, 1920.

1,379,561.

Patented May 24, 1921.

Harry D. Hathaway, Inventor.

UNITED STATES PATENT OFFICE.

HARRY D. HATHAWAY, OF BUFFALO, NEW YORK.

PEDAL ATTACHMENT FOR AUTOMOBILES.

1,379,561.

Specification of Letters Patent.  Patented May 24, 1921.

Application filed April 5, 1920.  Serial No. 371,225.

*To all whom it may concern:*

Be it known that I, HARRY D. HATHAWAY, a citizen of the United States, residing at Buffalo, in the county of Erie and State of New York, have invented certain new and useful Improvements in Pedal Attachments for Automobiles, of which the following is a specification.

My invention relates to a safety pedal attachment, and has more particular reference to attachments for the controlling pedal-levers of automobiles.

The object of my invention is to provide an improved attachment in the form of a support or rest for the foot used to operate the brake and clutch-shifting elements of automobiles, the attachment being applied to the pedals the levers of which extend upwardly through the foot board of automobiles, the attachment having a width considerably greater than the width of the pedals so as to make it easy to locate the pedals when it is necessary to quickly operate the same, thus enabling the driver of an automobile to assume a free position without retaining the operating foot, or the feet, as the case may be, upon the controlling mechanism which the brake and clutch-shifting elements partly constitute.

Another object of my invention is to provide an attachment for the brake and clutch-shifting pedals which are of extremely simple construction, which can be easily applied to the pedals, and which are exact counterparts capable of being arranged as right or left hand attachments, and which will also prevent the operator's feet slipping from the pedals.

With these and other objects in view, the invention consists in the novel features of construction, and in the arrangement and combination of parts to be hereinafter described and more particularly pointed out in the subjoined claims.

In the drawings:

Figure 1 is a perspective view of a portion of the foot board of an automobile, showing the lever slots therein and the brake-reversing and clutch-shifting elements extending into the automobile through said slots, with my improved attachments applied thereto.

Fig. 2 is an enlarged transverse section taken on line 2—2, Fig. 1.

Fig. 3 is an enlarged perspective view of one of the pedals with the metallic portion of my improved attachment applied thereto.

Fig. 4 is a section taken on line 4—4, Fig. 2.

In the drawings I have shown the type of operating pedal-levers used on Ford automobiles, and my improved attachment applied to the brake and clutch-shifting pedal elements.

The reference numeral 5 designates the foot board of an automobile having the lever slots 6 therein, three slots being shown, with the reversing pedal lever 7 extending through the intermediate slot. Through the outer slots the brake and clutch-shifting pedal levers 8, 9 are passed, each pedal lever having a head or pedal member 10, the face of which is somewhat curved in the direction of its length, but it is apparent that for some forms of pedal levers the head or pedal member may have its upper or contact face flat.

The head or pedal members are invariably narrower than the feet of the operator and comparatively short, and for this reason it is found necessary to maintain the feet of the operator in contact therewith under muscular strain, due to the jarring of the car, which would cause the feet to slip from the contact surface of the heads or pedal members, thereby losing momentary control of the automobile.

My improved attachment provides extended contact surfaces transversely of the pedal and comprises an elongated body portion 11, which may be and in the representative construction shown is formed of bar iron having one end thereof bent upwardly, as at 12, to form a retainer flange. A distance from the other end of said body portion, the material is rebent upon itself, as at 13, so as to pass around one edge of the pedal, as at 14, and its extremity is bent at an obtuse angle to the rebent portion to form a depending lip or flange 15. The body portion is therefore provided with a substantially U-shaped part, which receives a portion of the head or pedal member at one side thereof.

The body portion is provided with an opening 16 in the bight of the U-shaped part thereof, which opening is continued along the two parallel portions of the U-shaped part and terminates in V-shaped ends 17.

It is to be noted that the pedal is widest along its medial portion and tapers forwardly and rearwardly from said medial portion, and that the edges thereof are rounded at said medial portion and that the rounded portion of one of the side edges of the head or pedal member extends slightly into the opening of said attachment, as clearly shown in Fig. 4, thus preventing shifting of the body portion lengthwise of head or pedal member.

At a point between its ends, the body portion 11 is provided medially between opposite longitudinal edges with a longitudinal slot 18, the sides of which are beveled downwardly, and passing through said slot is a securing bolt 19 having a flared head 20 fitting into said slot and being bent, as at 21, to provide an angular portion 22 which extends obliquely underneath the head or pedal member and the web portion 23 of the lever extending lengthwise along said head or pedal member, the end of said bolt opposite the flared head being threaded and passed through an opening 24 in the depending lip or flange 15, and having a nut 25 threaded thereon which is tightened against said lip or flange and draws the headed end of the bolt firmly against the adjacent edge of the pedal, thus securely fastening the attachment to the pedal.

The tightening of the nut 25 draws the bight of the U-shaped part of the attachment firmly against one edge of the pedal at the medial region thereof, and also draws the headed end of the bolt against the other edge of said pedal, and by reason of the bolt being passed through the slot 18, the attachment may be applied to pedals of different widths.

If desired, the metallic body portion of the attachment may be covered with a rubber or other similar pad 27, which may be attached thereto in any approved manner.

In the drawings I have shown this pad provided with an upwardly-directed extension 28 at one end, which fits over the retainer flange 12 of the attachment, and at its other end with a pocket portion 29 adapted to receive the rebent end of said attachment, the longitudinal edges of the pad being formed to fit around the body portion of the attachment where the attachment extends outwardly beyond the head or pedal member, as clearly shown at 29, Fig. 2.

The attachment applied to the pedal provides an extended rest or support for the foot substantially twice that of the pedal so that a solid footing is assured for each of the feet adapted to operate the pedal. It is of course understood that the length of the attachment may be varied, so long as increased bearing surface is provided over that of the heads or pedal members of the pedal levers.

Having thus described my invention, what I claim is:

1. In a pedal attachment of the character described, a body portion having a medially arranged elongated slot therein between its ends, a securing element passed through said slot, and means extending from one end of said body portion and adapted to receive said securing element.

2. In a pedal attachment of the character described, a body portion having a longitudinal slot therein and having one end thereof provided with a depending lip, an angular bolt extending through the slot of said body portion and being directed toward said depending lip and through the same, and a nut applied to said bolt and adapted for engagement with said lip.

3. In a pedal attachment of the character described, a body portion having a depending lip at one end thereof, a bolt passed through said body portion at a distance from said lip and being bent at an angle and directed toward and through said lip, and a nut applied to said bolt and adapted to be engaged by said lip.

4. The combination with the pedal of a pedal lever, of a pedal attachment comprising a body portion having a depending lip, and a bolt passed through said body portion and directed obliquely underneath said pedal, said bolt extending through said lip and having a nut applied thereto engaging said lip.

5. The combination with the pedal of a pedal lever, of an attachment comprising a body portion arranged transversely over said pedal and lying in contact therewith, said body portion having a depending lip at one end thereof and having a longitudinal slot between its ends, a securing bolt passing through said slot and adjustable therein, said securing bolt having its headed end in contact with one edge of said pedal and being directed toward and through said depending lip, and a nut applied to the threaded end of said bolt and bearing against said lip.

6. The combination with the pedal of a pedal lever, of an attachment comprising a body portion having a re-bent part and a lip depending from said re-bent part, said re-bent part receiving the pedal at one side thereof, a bolt passed through said body portion and engaging the edge of said pedal at the other side thereof, said bolt being bent and directed underneath said pedal and through said depending lip, and a nut applied through the threaded end of said bolt and engaging said lip.

7. A pedal attachment of the character described formed of a metal bar bent upwardly at one end to form a retainer flange and being re-bent near its other end and terminating in a depending lip, a bolt passed through said metal bar between its ends and being bent adjacent its head and directed toward and through said depending lip, said bolt having a nut bearing against the outer surface of said lip.

8. A pedal attachment of the character described formed of a metal bar bent at one end to provide an upwardly-directed retainer flange and being re-bent upon itself near its other end to form a U-shaped part adapted to receive the pedal of a pedal lever at one side thereof, said last-mentioned end terminating in a depending lip and said bar having a longitudinal slot between its ends, and a bolt passed through said slot and bent adjacent its headed end for engagement with the edge of the pedal at the other side thereof, said bolt being directed obliquely so as to extend underneath the pedal and pass through said depending lip and having a nut thereon in engagement with said depending lip.

9. An attachment for pedals of the character described, comprising a body portion having a re-bent part at one end provided with a slot extending through said re-bent part, said re-bent part terminating in a depending lip arranged at an obtuse angle thereto, a bolt extending downwardly through said body portion and being bent at an obtuse angle with its threaded end passed through said depending lip, and a nut on said bolt in contact with said depending lip.

In testimony whereof I affix my signature.

HARRY D. HATHAWAY.